Feb. 20, 1962

O. H. BANKER 3,021,730

PLANETARY SPEED-RATIO DEVICE

Filed March 30, 1959

INVENTOR.
OSCAR H. BANKER
BY
Willard D. Eakin
ATTORNEY

Feb. 20, 1962 O. H. BANKER 3,021,730
PLANETARY SPEED-RATIO DEVICE
Filed March 30, 1959 2 Sheets-Sheet 2

INVENTOR
OSCAR H. BANKER

BY Willard D. Eakin
ATTORNEY

United States Patent Office 3,021,730
Patented Feb. 20, 1962

3,021,730
PLANETARY SPEED-RATIO DEVICE
Oscar H. Banker, Evanston, Ill., assignor to Fawick Corporation, a corporation of Michigan
Filed Mar. 30, 1959, Ser. No. 802,987
6 Claims. (Cl. 74—798)

This invention relates to planetary power-transmitting devices in which a set of circumferentially spaced balls or the like, driven by friction, function in a manner similar to that of planet gears to give a driven member a rotary speed different from that of the driving member.

Its chief objects are to provide a device of this character having low frictional loss of power; to avoid excessive wear of parts; to provide in an improved manner for maintaining effectiveness and uniformity of the driving friction; and to avoid undesirable cramping of the planet balls between the sun element and the ring element.

Figure 1:
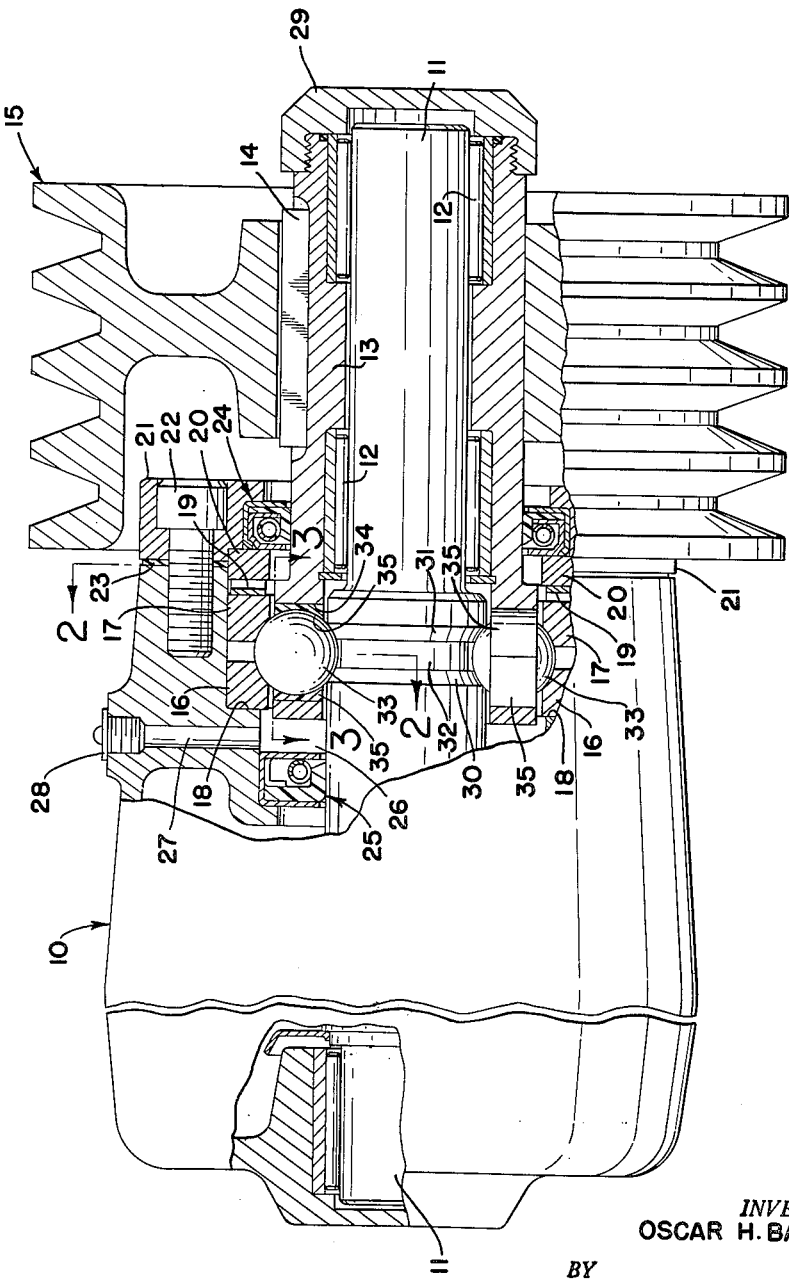
FIG. 1 is an axial section, with parts shown in elevation and broken away, of a motor and speed-reducer assembly embodying my invention in its preferred form.

Referring to the drawings, an electric motor 10 has a projecting motor-shaft 11 upon which is journaled, with roller bearings 12, 12, a planet carrier 13 having a terminal planet-cage portion extending into the housing of the motor and there surrounding a sun-element part of the motor shaft 11. Secured upon the journaled sleeve part of the planet carrier, with key 14, is the driven member, here shown as a multiple-V-belt pulley 15.

The planet-ring element of the device comprises a pair of outer ball races 16, 17 slidably fitted at their outer peripheries in a cylindrical socket in the motor casing, the race 16 being held against leftward movement by a shoulder 18 in the said socket and the race 17 being constantly urged toward the race 16 by an undulant spring washer 19 interposed between the race 17 and a backing ring 20 which fits in the mouth of the race's socket and in a centering recess formed in the adjacent face of a retaining and closure ring 21 which is held to the end face of the motor casing by bolts 22, 22 and coacts with a gasket 23 and an oil-seal 24 to seal it respectively to the motor casing and to the relatively rotary planet carrier 13. Another oil seal, 25, isolates the wiring of the motor from an oil chamber 26, provided with a filler hole 27 and closure plug 28, the said chamber being closed at the right by the oil seal 24 and a closure cap 29 which is screwed upon the adjacent end of the planet carrier 13 and encloses the adjacent end of the motor shaft.

At the axial position of the outer ball races 16, 17 the motor shaft 11 is formed with a pair of inner ball races 30, 31 axially separated by a relatively deep groove 32. The planet balls, 33, 33, are of such size that they contact and roll upon all of the races 16, 17, 30, 31 and in so doing hold the race 17 axially spaced from the race 16, against the force of the spring washer 19.

The races are here shown as fitting against the balls throughout the axial widths of the races, because of which the contact of the balls with the races is not wholly a rolling contact throughout the widths of the races, but because of the narrowness of the races' ball-contacting faces this does not represent any important loss of power and any such loss of power is partially or wholly offset by the advantage of having area contact as distinguished from point contact of the balls with the races. Moreover, the invention is not wholly limited to this feature of area contact.

The force of the spring 19 provides a yielding pressure of the balls against all of the four races and the well spaced, four-zone contact provides a definite, accurate and stable orbit for the balls.

For each ball the wall of the cage part of the planet carrier 13 is formed with a radially extending through hole 34 of greater diameter than that of the ball to accommodate, with a free sliding fit, an anti-friction shell extending about an equatorial zone of the ball. Between the holes 34, and defining them, are torque-transmitting planet-cage elements 34a, 34a.

Figure 4:
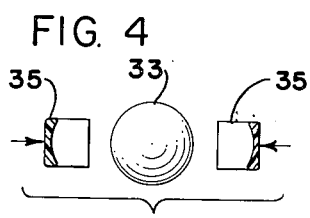
FIG. 4 is an elevation of one of the planet balls showing also, in section, a pair of half-shells, of anti-friction material, in position to become associated with the ball.
Figure 5:
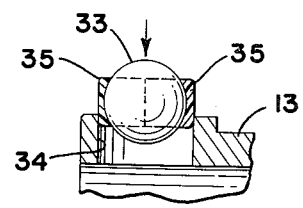
FIG. 5 is a fragmentary axial section of the planet-cage assembly illustrating the manner of assembly of the balls and their anti-friction shells with the planet-cage.

In the present drawing the anti-friction shell is shown in its preferred form as consisting of two half-rings 35, 35 of self-lubricating or slippery material such as nylon, each internally formed to fit against the ball and externally of half-cylinder form, so that when the two half-shells are brought against the ball as contemplated in FIG. 4 they, with the ball, constitute an externally cylindrical sub-assembly adapted to be slipped radially of the assembly into their hole 34 as illustrated, at a part-way-in stage, in FIG. 5.

Figure 2:
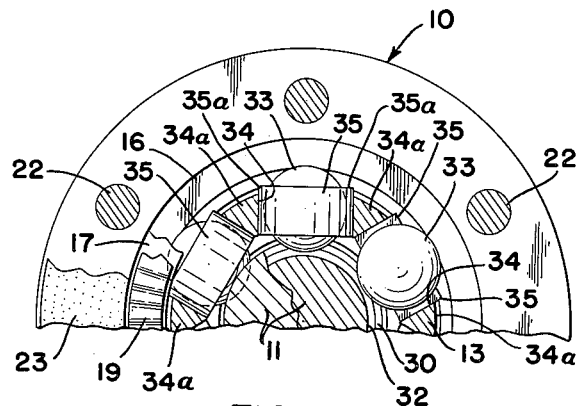
FIG. 2 is a fragmentary section on the indirect line 2—2 of FIG. 1.
Figure 3:
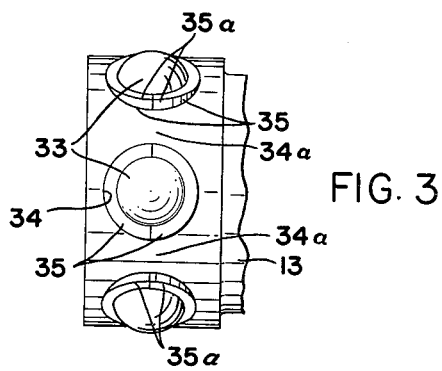
FIG. 3 is a section on line 3—3 of FIG. 1.

In this embodiment the shells are shown as having plane end faces at right-angles to their cylinder-axes, which account for the projecting corners at 35a, 35a in FIGS. 2 and 3, but such shape is preferred only as a matter of possible economy in the making of the shells and the invention is not wholly limited to that shape.

When the parts are fully assembled, as in FIGS. 1 and 2, contact of the balls with the inner and outer races determine the radial positions of the shells in their holes 34 of the planet cage, the balls having interlock, radially of the assembly, with the shell halves, and the slidability of the shells in the holes avoids any appreciable resistance to the maintaining of full friction-drive contact of the balls with all of the four races. The cylindrical faces of the shells are of such extent radially of the assembly that they provide wide-span slide-bearing contact and thus cramping of the shells in their holes is avoided.

In operation of the device the torque is transmitted from the balls to the planet carrier through the shells, which are in effect peripheral journal bearings for the balls and, because of the slippery character of the nylon or the like they permit rotation of the balls on their own axes with very little frictional resistance, and especially when they run in grease or oil provided in the sealed chamber 26.

Even though the balls thus run in oil they have adequate and in fact surprisingly good driving friction in their metal-to-metal contacts with the races.

Figure 6:
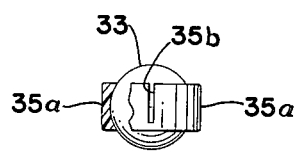
FIG. 6 is an elevation of a modified sub-assembly.

In the modified ball-and-journal-bearing sub-assembly shown in FIG. 6 the two half-shells, 35a, 35a, are formed as an integral unit, by cutting or molding, but with the two part way separated by the gap or cut 35b, so that they can be sprung apart for removal or insertion of the ball but will retain the ball when it is in place so that the sub-assembly can be handled as a unit without falling apart.

Other modifications are possible without departure from the scope of the invention as defined by the appended claims.

I claim:

1. In a planetary power-transmitting device having means defining an outer annular ball race, means defining an inner ball race disposed radially inward from said outer race, a plurality of balls engaged between said outer and inner races, and rotatable ball-carrying means extending between said outer and inner races and carrying said balls, said ball-carrying means having radial openings therein which receives said balls, the improvement which comprises a plurality of ball-engaging shells of anti-friction material received in said openings and rotatably supporting said balls individually therein, each of said shells extending substantially completely around the respective ball in a direction perpendicular to the radial depth of the respective radial opening, and each of said shells being spherically curved internally to conform throughout its internal extent snugly to the respective ball and having sliding contact with the ball throughout substantially the entire radial depth of the corresponding opening.

2. In a planetary power-transmitting device having means defining an outer annular ball race, means defining an inner ball race disposed radially inward from said outer race, and a plurality of balls engaged between said outer and inner races, the improvement which comprises the combination of rotatable ball-carrying means extending between said outer and inner races and carrying said balls, said ball-carrying means having radial openings therein which receive said balls, each of said openings being uniform in cross section throughout its radial depth, and a plurality of ball-engaging shells of self-lubricating anti-friction material received in said openings and rotatably supporting said balls individually therein, each of said shells having sliding contact with the ball-carrying means throughout substantially the entire radial depth of the corresponding opening therein and being free to slide radially inward and outward in said opening.

3. The power-transmitting device of claim 2 wherein each of said shells extends substantially completely around the respective ball in a direction perpendicular to the radial depth of the respective radial opening and has sliding contact with the respective ball throughout the major portion of the radial depth of the corresponding opening.

4. The power-transmitting device of claim 3 wherein each of said shells is composed of portions which are separable from each other when the shell is removed from the respective opening, so as to facilitate the assembly together of each shell and the corresponding ball.

5. The power-transmitting device of claim 4 wherein said separable portions of each shell are disconnected from each other.

6. The power-transmitting device of claim 4 wherein each shell is a one-piece annular member having transverse slits therein between said separable portions of the shell.

References Cited in the file of this patent

UNITED STATES PATENTS

| Re. 18,175 | Erban | Sept. 1, 1931 |
| 2,528,470 | Elder | Oct. 31, 1950 |
| 2,869,373 | Erbe et al. | Jan. 20, 1959 |

FOREIGN PATENTS

| 820,842 | France | Nov. 19, 1937 |
| 1,016,809 | France | Nov. 24, 1952 |

OTHER REFERENCES

"Nylon Parts for Ball Bearing," Product Engineering, February 1952, pages 119–123.